United States Patent
Farrell et al.

(10) Patent No.: US 10,771,392 B1
(45) Date of Patent: Sep. 8, 2020

(54) INCREASING EFFICIENCY TO RATE LIMITING

(71) Applicant: International Business Machines Corporation, Armonk, NY (US)

(72) Inventors: Leo Michael Farrell, Tamborine Mountain (AU); Scott Matthew Andrews, Ashmore (AU); Philip Alan John Nye, Southport (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/439,013

(22) Filed: Jun. 12, 2019

(51) Int. Cl.
*H04L 12/819* (2013.01)
*H04L 12/24* (2006.01)
*H04L 29/08* (2006.01)
*H04L 29/12* (2006.01)

(52) U.S. Cl.
CPC ........ *H04L 47/215* (2013.01); *H04L 41/0266* (2013.01); *H04L 61/2007* (2013.01); *H04L 61/6022* (2013.01); *H04L 67/02* (2013.01)

(58) Field of Classification Search
None
See application file for complete search history.

(56) References Cited

U.S. PATENT DOCUMENTS 9,071,526 B2   6/2015  Avdanin et al.
10,135,740 B2 * 11/2018 Yin ..................... H04L 43/16

FOREIGN PATENT DOCUMENTS

CN    107800644 A   3/2018
EP    1683304 B1   12/2018

OTHER PUBLICATIONS

Mahdi, "An alternative approach to rate limiting," https://blog.figma.com/an-alternative-approach-to-rate-limiting-f8a06cf7c94c, printed Feb. 6, 2019, 12 pgs.
Mell et al., "The NIST Definition of Cloud Computing," Recommendations of the National Institute of Standards and Technology, U.S. Department of Commerce, Special Publication 800-145, Sep. 2011, 7 pgs.
Wikipedia, "Token bucket," https://en.wikipedia.org/wiki/Token_bucket, printed Feb. 6, 2019, 4 pgs.
Xu, Y. "High-performance rate limiting," https://medium.com/smyte/rate-limiter-df3408325846, Oct. 12, 2016, printed Feb. 6, 2019, 6 pgs.

* cited by examiner

*Primary Examiner* — Ayanah S George
(74) *Attorney, Agent, or Firm* — Mark Bergner

(57) ABSTRACT

A computer-implemented system and method include a rate-limiting server. The server receives a request from a client and uses an early stage process to search for a rate-limiting token bucket (TB) using metadata associated with the request. Responsive to finding the TB using the first metadata, a response operation is performed. Responsive to not finding the TB using the first metadata, a late stage process is used to search for the rate-limiting TB using server-side session data associated with the request. Responsive to not finding the TB using the session data, the TB is created and associated with at least two search indexes comprising the first metadata associated with the request and the session data. Finally, the response operation is performed that comprises transmitting a determined response to the client.

20 Claims, 8 Drawing Sheets

INCREASING EFFICIENCY TO RATE LIMITING

BACKGROUND

Disclosed herein is a system and related method for increasing the efficiency of rate limiting in a networked computer architecture.

In certain computer architectures, it may be desirable to control resources provided by a server or service provider computer to clients requesting data or services. When the server is tasked with controlling access in a predefined way, one mechanism for doing so is called "rate-limiting". Using such a mechanism permits the server to restrict access to communications or information from the server when a client requests too much.

SUMMARY

According to one or more aspects disclosed herein, a computer-implemented method uses a processor of a server that receives a request from a client via a network interface of the server. In utilizing an early stage process, the method searches for a rate-limiting token bucket (TB) using first metadata associated with the request. Responsive to finding the TB, the method uses the first metadata to perform a response operation. Responsive to not finding the TB using the first metadata, the method utilizes a late stage process to search for the rate-limiting TB using server-side session data associated with the request. Responsive to not finding the TB using the session data, the method comprises creating the TB and associating with it at least two search indexes comprising the first metadata associated with the request and the session data. Finally, the method performs the response operation that comprises transmitting, via the network interface, a determined response to the client.

According to one or more aspects disclosed herein, a server computer system provides rate limiting using a processor. The processor is configured to receive a request from a client via a network interface of the server, and utilize an early stage process to search for a rate-limiting token bucket (TB) using first metadata associated with the request. Responsive to finding the TB using the first metadata, the processor is configured to perform a response operation, and responsive to not finding the TB using the first metadata, the processor is configured to utilize a late stage process to search for the rate-limiting TB using server-side session data associated with the request. Responsive to not finding the TB using the session data, the processor is configured to create the TB and associate with it at least two search indexes comprising the first metadata associated with the request and the session data. The processor is further configured to perform the response operation, wherein the response operation comprises the processor being configured to transmit, via the network interface, a determined response to the client.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
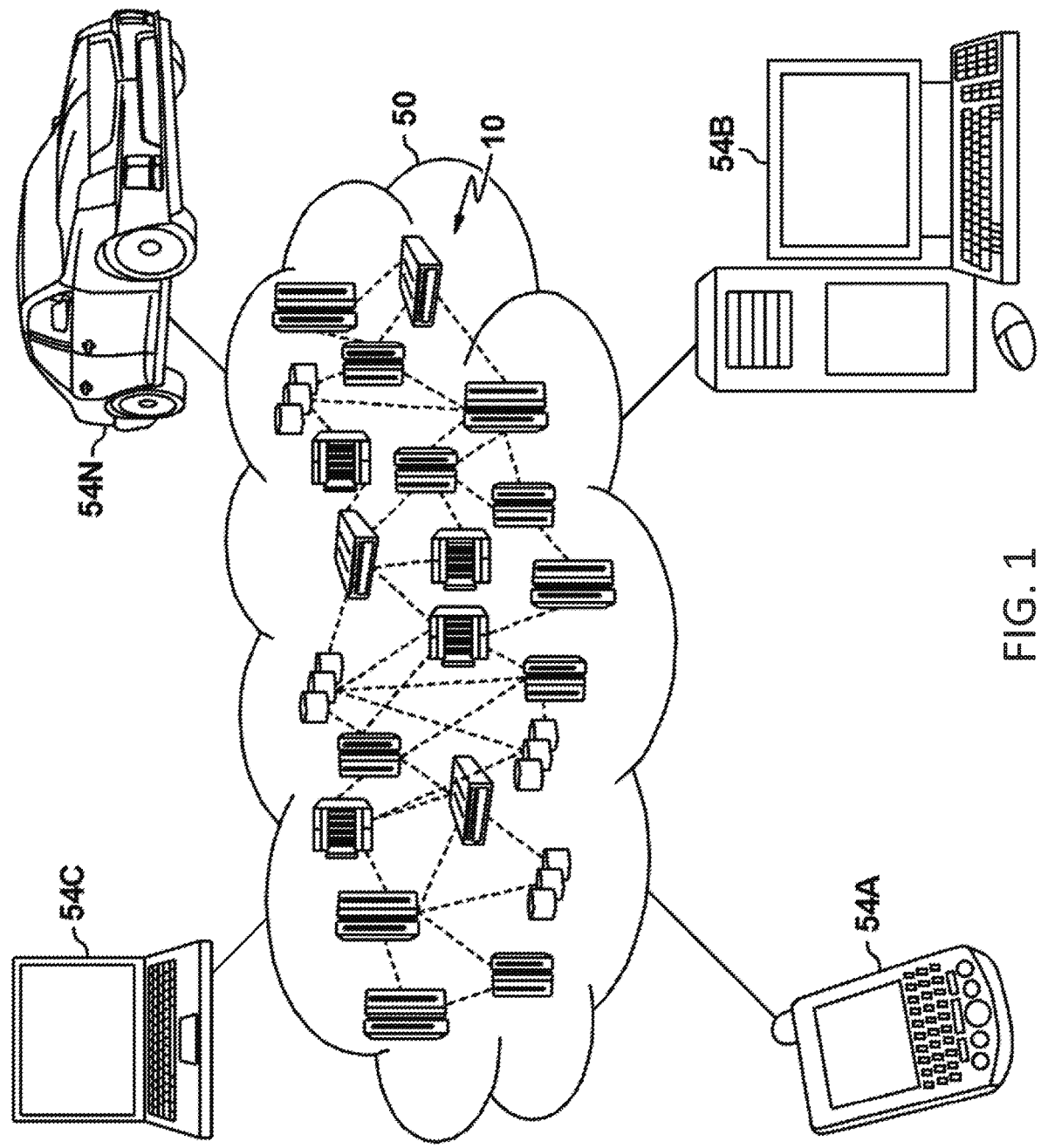
FIG. 1 depicts a cloud computing environment according to an embodiment of the present invention.

In order to deliver satisfactory performance, it may be desirable to have a server computer provide efficient rate limiting to users of services of the server. Use of token buckets may provide desired rate-limiting functions, but locating the correct token bucket to use, particularly when client-side information changes, may be difficult.

The following acronyms may be used below:
API application program interface
ARM advanced RISC machine
C Cookie
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
HTTP hypertext transfer protocol
IaaS infrastructure as a service
I/O input/output
IP Internet protocol
IPL initial program load
ISP Internet service provider ISA instruction-set-architecture
LAN local-area network
LPAR logical partition
LTA logging/tracking/audit
MAC media access control
PaaS platform as a service
PDA personal digital assistant
PLA programmable logic arrays
RAM random access memory
RISC reduced instruction set computer
ROM read-only memory
SaaS software as a service
SLA service level agreement
SOI search optimization service
SRAM static random access memory
TB token bucket
URL uniform resource locator
WAN wide-area network Cloud Computing It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
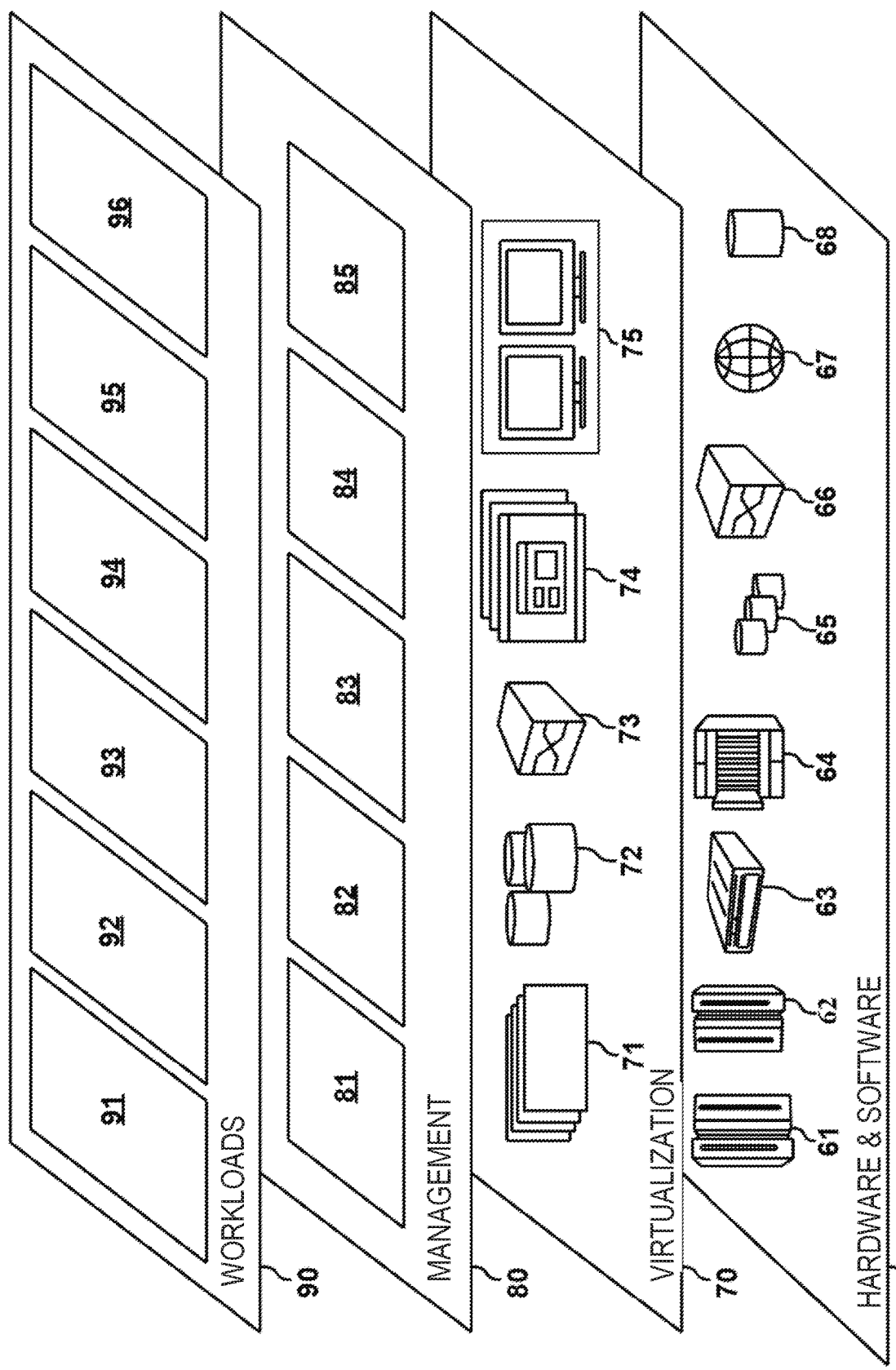
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System

Figure 3:
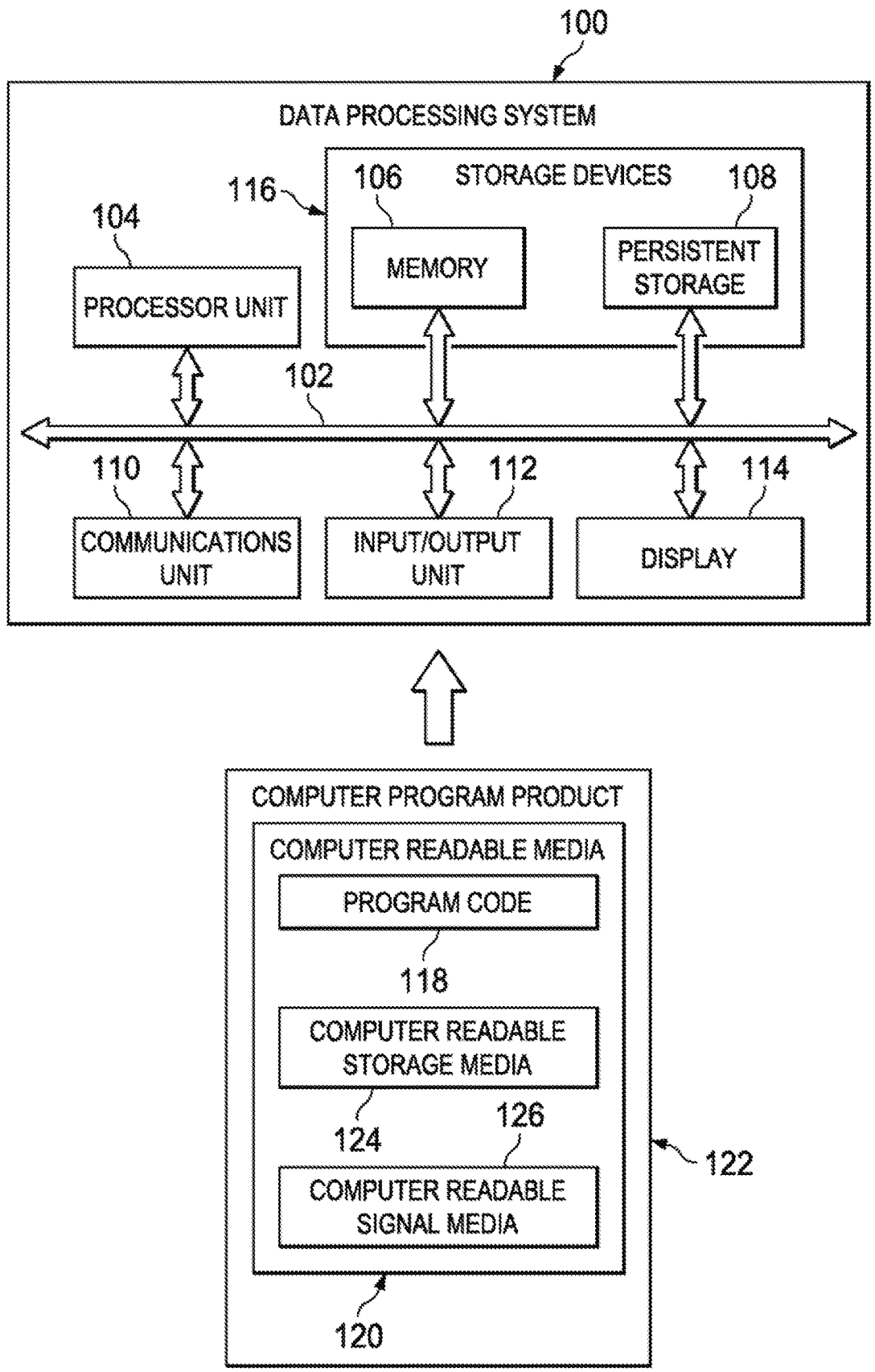
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1 may be varied from the illustrative examples shown.

In modern computer system designs, one entity, such as a client computer, may ask another entity, such as a server computer, to respond to a request sent over a network. A request may be a request to perform some activity, such as returning information for the requester. The terms "client computer" and "server computer" are used herein to delineate a requester and a provider or responder, respectively—however, these terms are to be construed broadly and should not be limited to any particular or specific client-server architecture, or any particular type of computer or telecommunication network.

It may be desirable in these types of architectures, in some situations, to allow everyone some predefined level of access to resources provided by the server. In these situations, to prevent a particular client from accessing more than its fair share (or some predetermined level) of resources, the server may make use of rate limiting—i.e., limiting a number or quantity of requests or response information based on some attribute of the requester. One technical solution to the technical problem of rate limiting in a networked computer environment is to use a token bucket. A token bucket is an algorithm that may be used in packet-switched computer networks and telecommunications networks to check that data transmissions (e.g., packets) conform to defined limits on bandwidth and other characteristics, such as burstiness (a measure of the unevenness or variations in the traffic flow). The token bucket may also be used as a scheduling algorithm to determine compliant transmission timing based on limits set for, e.g., the bandwidth and burstiness.

The token bucket algorithm may be thought of as a fixed capacity bucket into which tokens (representing a unit of bytes/a single packet of predetermined size) are added at a fixed rate. When a packet is to be checked for conformance to the defined limits, the bucket is inspected to see if it contains sufficient tokens at that time. If so, the appropriate number of tokens, e.g., equivalent to the length of the packet in bytes, are removed ("cashed in"), and the packet is passed, e.g., for transmission. The packet does not conform if there are insufficient tokens in the bucket, and the contents of the bucket are not changed. Non-conformant packets can be treated in various ways—they may be: dropped, enqueued for subsequent transmission when sufficient tokens have accumulated in the bucket, and transmitted, but marked as being non-conformant, possibly to be dropped subsequently if the network is overloaded.

A conforming flow can thus contain traffic with an average rate up to the rate at which tokens are added to the bucket, and have a burstiness determined by the depth of the bucket. This burstiness may be expressed in terms of either a jitter tolerance, i.e., how much sooner a packet might conform (e.g., arrive or be transmitted) than would be expected from the limit on the average rate, or a burst tolerance or maximum burst size, i.e., how much more than the average level of traffic might conform in some finite period. One simple algorithm implementation may be that a token is added to the bucket every 1/rate seconds, and the bucket can hold at the most n tokens. If a token arrives when the bucket is full, it is discarded. When a packet of n bytes arrives, if at least x tokens are in the bucket, n tokens are removed from the bucket, and the packet is sent to the network. Conversely, if fewer than n tokens are available, no tokens are removed from the bucket, and the packet is considered to be non-conformant.

Rate-limiting may be applied using the HTTP protocol in the context of a web browser client and server, i.e., limiting a web browser client in its access to a server. When applied to the HTTP protocol in the context of a web server, from a security perspective (e.g., in a context of denial of service attacks, fuzzing, and brute force attacks), an inbound HTTP request may contain, or have associated with it, information used to associate a proper token bucket and allocate respective tokens from this bucket with the originator of the HTTP request. Such information for the request may include any or all of: a requester's URL, an HTTP method, header value(s), cookie(s), and over the wire information (e.g., IP address, MAC address, etc.).

The HTTP request, however, may not always contain all of the data related to a request, and therefore server side sessions are often maintained and can contain richer information to identify the request such that more effective rate limiting can be achieved.

For example, while the incoming HTTP request only contains a URL and an opaque (e.g., used as a 'reference' to a value stored server side) cookie value to identify a request from a given user-agent and associated session, the server session may contain a clearly understood "username" value. The username is issued when the account is created—its presented to log in, and then stored in the server-side session. When the opaque cookie value is presented, that server-side session is retrieved and the username is then available to the server once more.

Furthermore, there are computational (CPU/memory) and evaluation (time) costs associated with using the cookie value to correlate the server-side session and retrieve server-side data (e.g., the username or contact information) when the HTTP request does not contain this data. Additionally, this server-side data may not be appropriate to be returned to the client itself and therefore must be only available to the server-side processing. These costs may be further exacerbated where additional disparate systems are queried for user session data and indexes when no central, on-box session store is available and additional costs, such as financial (monetary) costs, may be introduced for distributed workload and network traffic consumption. Network consumption may be reduced in this situation if this sort of rate limiting saves the server from making any additional network calls as part of the processing which occurs between the "early" and "late" rate limiting processing. For example, sometimes the server-side session is stored remotely so several servers in a cluster can work with it together, and thus, the late processing may require a callout to that service. In contrast, the early processing does not require this.

Disclosed herein are various embodiments of a system and method for improving efficiency and effectiveness of rate limiting for web servers that use such rate limiting. This may be achieved, according to various embodiments, by maintaining a value pair as an index into the rate limiting bucket. The value pair may comprise cookie information and another value associated with server session-side information that is not modifiable by the client (e.g., username). The efficiency may be achieved by performing relatively slow and resource-intensive session information look-up in a late request process only when necessary, and utilize the relatively fast and resource-light information look-up in an early request process at other times. The server-side session correlation can be largely avoided, requiring the "heavy" costs during particular system states, such as when a new session is established, and which requires the "expensive" resource costs to be incurred. When applied, the system may provide a cost saving of machine and physical resources as well as a safeguard against request abuse, thereby enhancing the security of the application implementing the system.

This system may be applied to various web-based, or other networking technologies, including but not limited to: a) prevention of individual user account abuse incorporating brute force (e.g., presentation of thousands of username/password combinations in an attempt to guess the password) and multi-client concurrent requests; b) prevention of OAuth Bearer token abuse and reuse (e.g., presentation of thousands of access token values in the hope of guessing one); and c) prevention of OAuth client abuse of targeted or exploited applications (e.g., an attacker takes over an OAuth client, and then in very quick succession uses tokens to invoke an unreasonable number of APIs).

Figure 4:
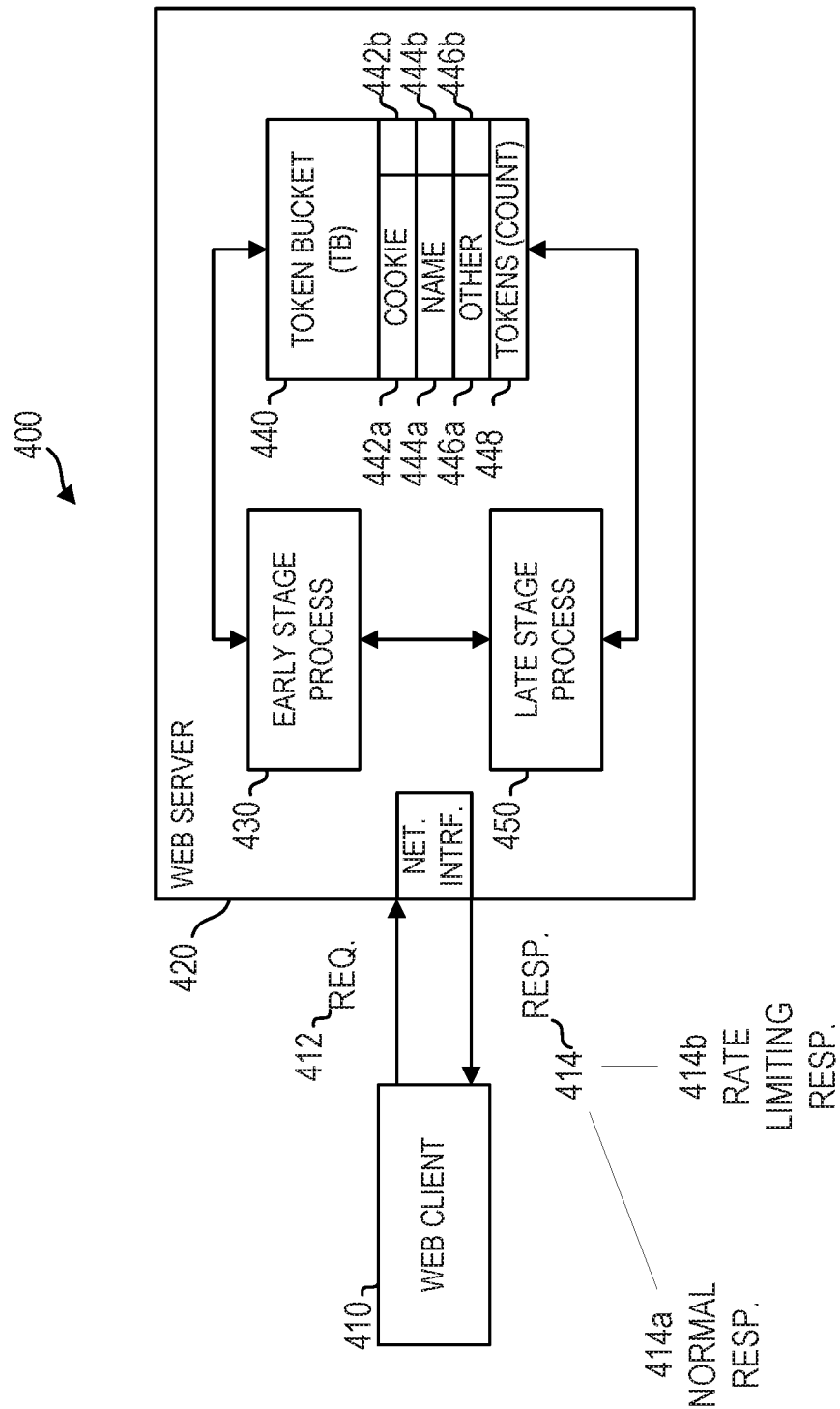
FIG. 4 is a high-level block diagram of one or more embodiments of a rate-limiting system.

FIG. 4 is a block diagram of an example system 400 according to some embodiments. A web client 410 interacts with a web server 420 by sending HTTP requests 412 and receiving HTTP responses 414 which, for the purposes described herein, may comprise a normal response 414a (meaning the request was properly handled) or a rate limiting response 414b. The web server 420 may utilize an early stage process 430 (this may describe one or more processes that may be handled quickly and without the use of more extensive resources), as well as a late stage process 450 (this may describe one or more processes that may be handled using more extensive and/or time consuming resources). An early stage process may be one in which some predefined limit(s) on any/all of CPU time, network traffic, storage I/O, memory I/O, or other limited resource (or respective costs) are not exceeded, and a late stage process may be one in which any or all of these predefined limits are met or exceeded. The web client 410 and web server 420 may each be, for example, a data processing system 100, as described above.

The rate limiting may utilize a token bucket (TB) 440 that utilizes tokens (or a count value) 448 that are incremented (or decremented) and cause a rate limiting response to be returned when the TB is full (or empty). A variety of indexes used to locate the relevant TB from among many potential TBs that may be in use on the system may be included in or associated with the TB 440, including those contained in the metadata of the web client request 412 (e.g., cookie data or other metadata described herein), and those not contained in the metadata, but that are contained in session data associated with a user session.

In some implementations, the session data may be available only to the web server 420. The metadata-type indexes may be utilized for the early stage process 430 since additional resources need not be used to locate the TB 440, whereas the session data-type indexes may be utilized for the late stage process 450 since additional resources are needed to associate relevant session data with metadata associated with the HTTP request 412. The request metadata may, in some implementations, be obtainable solely from the contents of the request 412 or a communication channel associated with the request.

As shown in FIG. 4, a cookie index 442 (shown broken down into constituent components of a cookie descriptor 442a and its value 442b) is one of the metadata-type indexes that may be used to search for and locate the relevant TB 440. Similarly, a username index 444 (also similarly broken down into the username descriptor 444a and its value 444b) is one of the session data-type indexes that may be used to search for and locate the relevant TB 440. For the cookie descriptor 442a, a value 442b of "A" may be provided so that the cookie index 442 is cookie A (CA). For the username descriptor 444a, a value 444b of "joeschmoe@aol.com" may be provided. Other descriptors 446a and values 446b may be utilized as well. These descriptor indexes are by way of example only, and any form of request metadata and/or session data may be used for the TB 440.

Figure 5A:
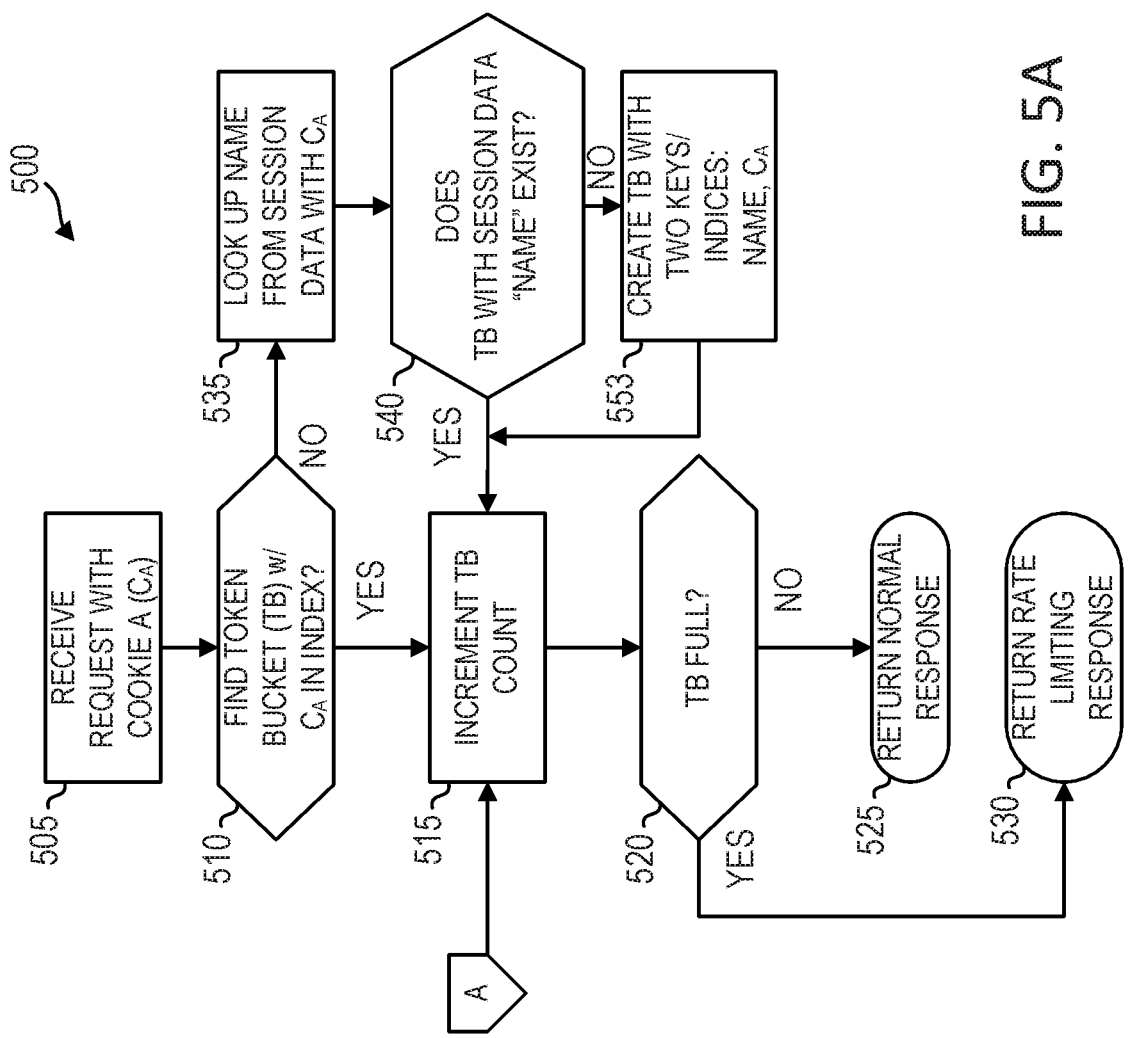
FIGS. 5A and 5B are parts of a flowchart illustrating one or more embodiments of a computer-implemented method for performing rate limiting.
Figure 5B:
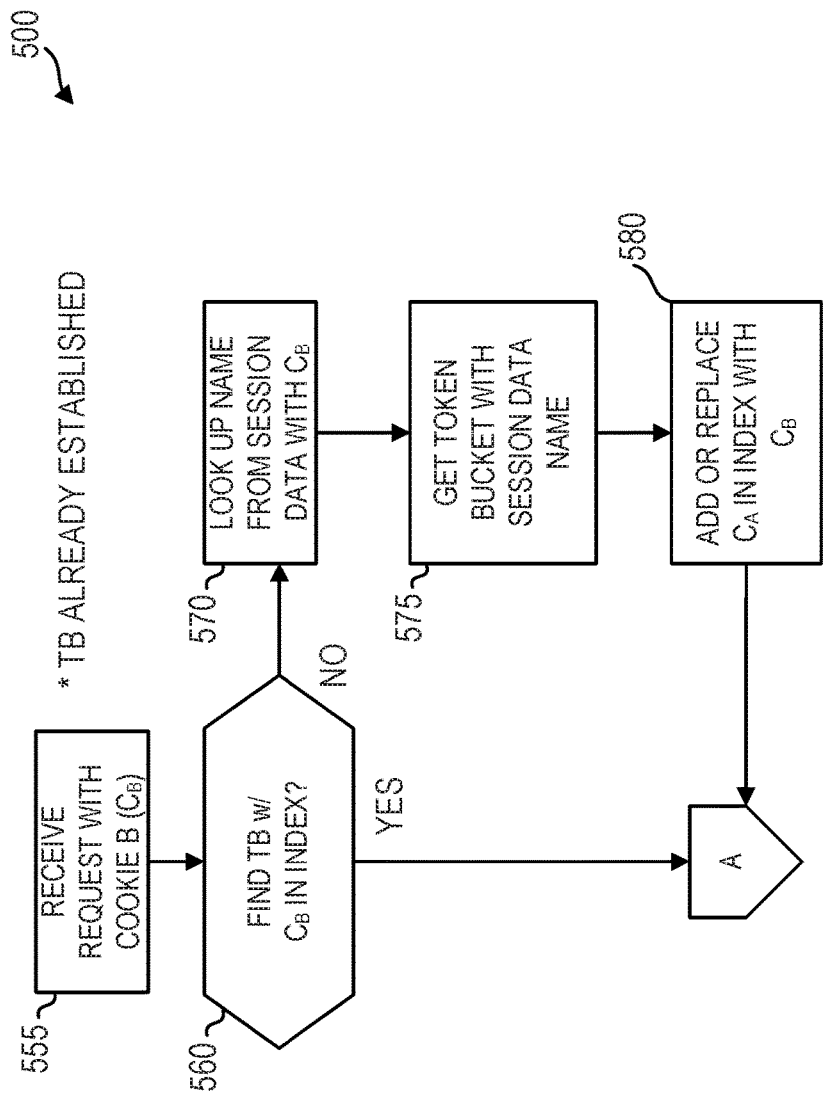

FIGS. 5A and 5B are parts of a flowchart that illustrates a process 500 according to various embodiments. The process 500 illustrates various web requests 412 sent from the web client 410 to the web server 420. Referring to FIG. 5A, in operation 505, the web server 420 may receive an HTTP request 412 containing cookie A (CA). The early stage process 430, in operation 510, attempts to locate the relevant TB 440 using the cookie index 442 CA as first metadata. If it is able to locate the TB 440 using the CA (510: Y), in operation 515, it increments the count 448. Although the present description discusses the incrementing of a count in a bucket and testing for fullness, it is intended that this example illustration serves as a proxy herein and that decrementing an index and testing for emptiness as well as other known techniques for using similarly implemented token bucket technologies are to be considered applicable as well. In operation 520, a check is made to see if the TB 440 is full. If so (520: Y), the web server 420 returns, in operation 530, a rate limiting response 414b to the web client 410. Otherwise, if not (520: N), the web server 420 returns, in operation 525, a normal response 414a to the web client 410. An example of a rate limiting response returned in operation 530 may be a "429: Too Many Requests" response.

If the appropriate TB 440 cannot be found in using the cookie index (510: N), then, in operation 535, the late stage process 450 attempts to locate the TB 440 using session data—specifically, in this example implementation, a username. In operation 540, the late stage process 450 checks to see if the TB 440 can be found using the username. If so (540: Y), control may be returned to the early stage process 430 in which the count 448 may be incremented in operation 515, and a further test be made, in operation 520, to determine if the TB 440 is full. If it is full (520: Y), then the web server 420 returns the rate limiting response 414*b* to the web client 410 in operation 530. If the TB 440 is not full, then the web server 420 returns the normal response 414*a* to the web client 410 in operation 525. If the TB 440 cannot be found using the username (540: N), then, in operation 553, a new TB 440 may be created that has two keys: the username (from the session date), and CA (from the request metadata). Operation continues as before at operation 515. Operations 515-530 may be implemented in either the early stage process 430 or the late stage process 450 (or the functionality may be duplicated in both).

FIG. 5B is a part of the flowchart that illustrates the process 500 when a web client 410 HTTP request 412 is sent to the web server 420 containing a new cookie. In this case, the TB 440 has already been created, CA has been discarded on the client side due, e.g., to the user logging out and then logging in to receive a new cookie B (CB). In operation 555, the web server 420 receives an HTTP request 412 from the web client 410 containing CB as second metadata. A search is made, in operation 560, to determine if the TB 440 may be found using the cookie index CB. During a first time through this part of the process with CB, a cookie index for CB has not associated with the TB 440, and thus, in operation 560, the TB 440 has not been found using the cookie index CB, and operation continues via 560: N. In operation 570, a lookup of the username from the session data is performed, and in operation 575, the TB 440 is located by using the username (which does not vary and is not changeable by the requester). Once the TB 440 is located, in operation 580, the session index is updated to replace CA with CB, or, in one implementation, CB is added to the TB indexes, such that the TB 440 may be found using either CA or CB. Processing may continue back at operation 515, as described above. Once the TB index has been updated with CB in operation 580, the execution in operation 560 proceeds along the 560: Y path back to operation 515 as well. Advantageously, in this way, the system may make use of the more costly late stage process 450 utilizing session information when needed, but otherwise utilize the less costly early stage process 430 utilizing the request metadata to perform the rate limiting.

Figure 6A:
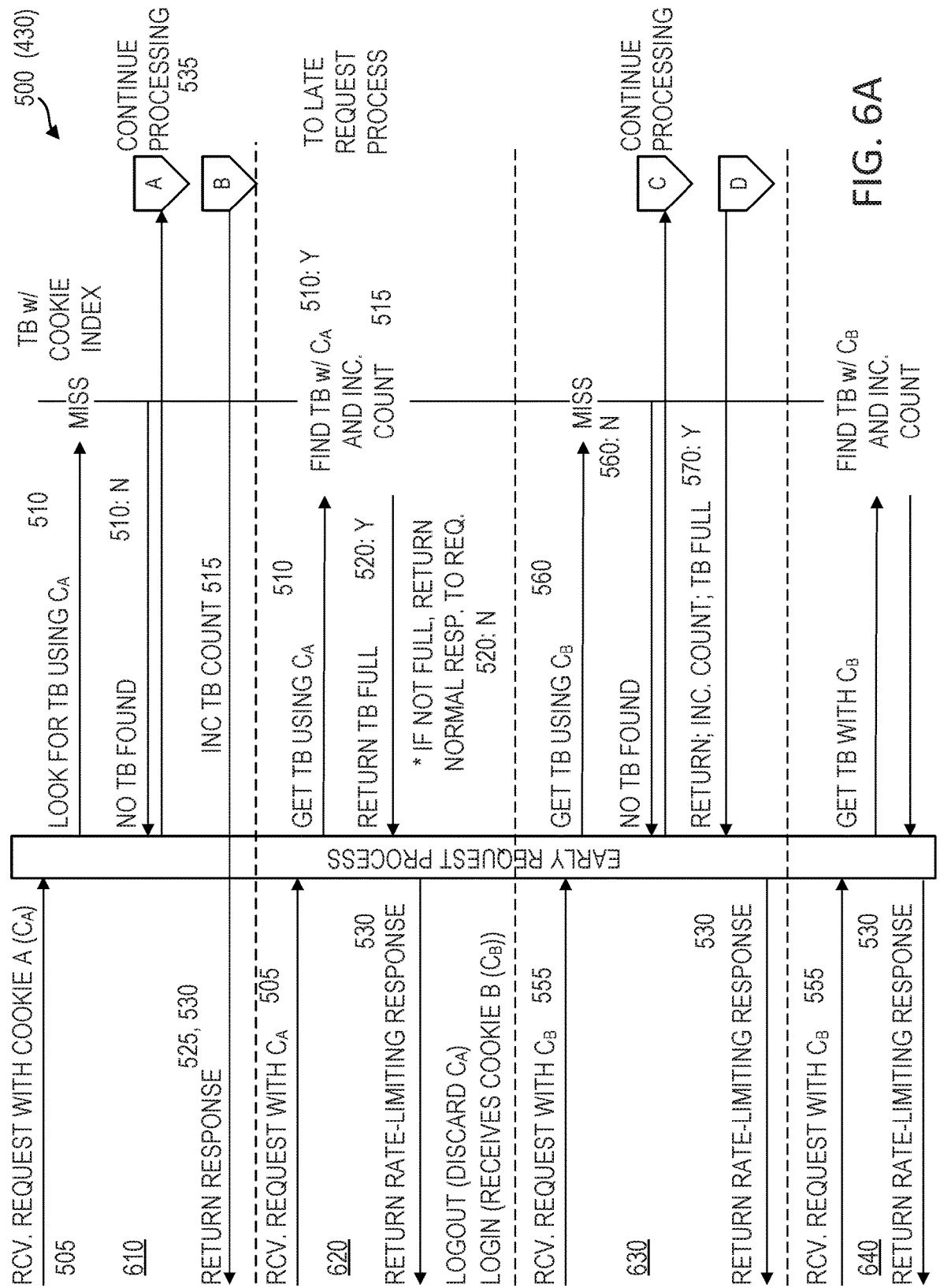
FIGS. 6A and 6B are parts of a combined timing/flow diagram illustrating operations according to one or more embodiments of a rate limiting process.
Figure 6B:
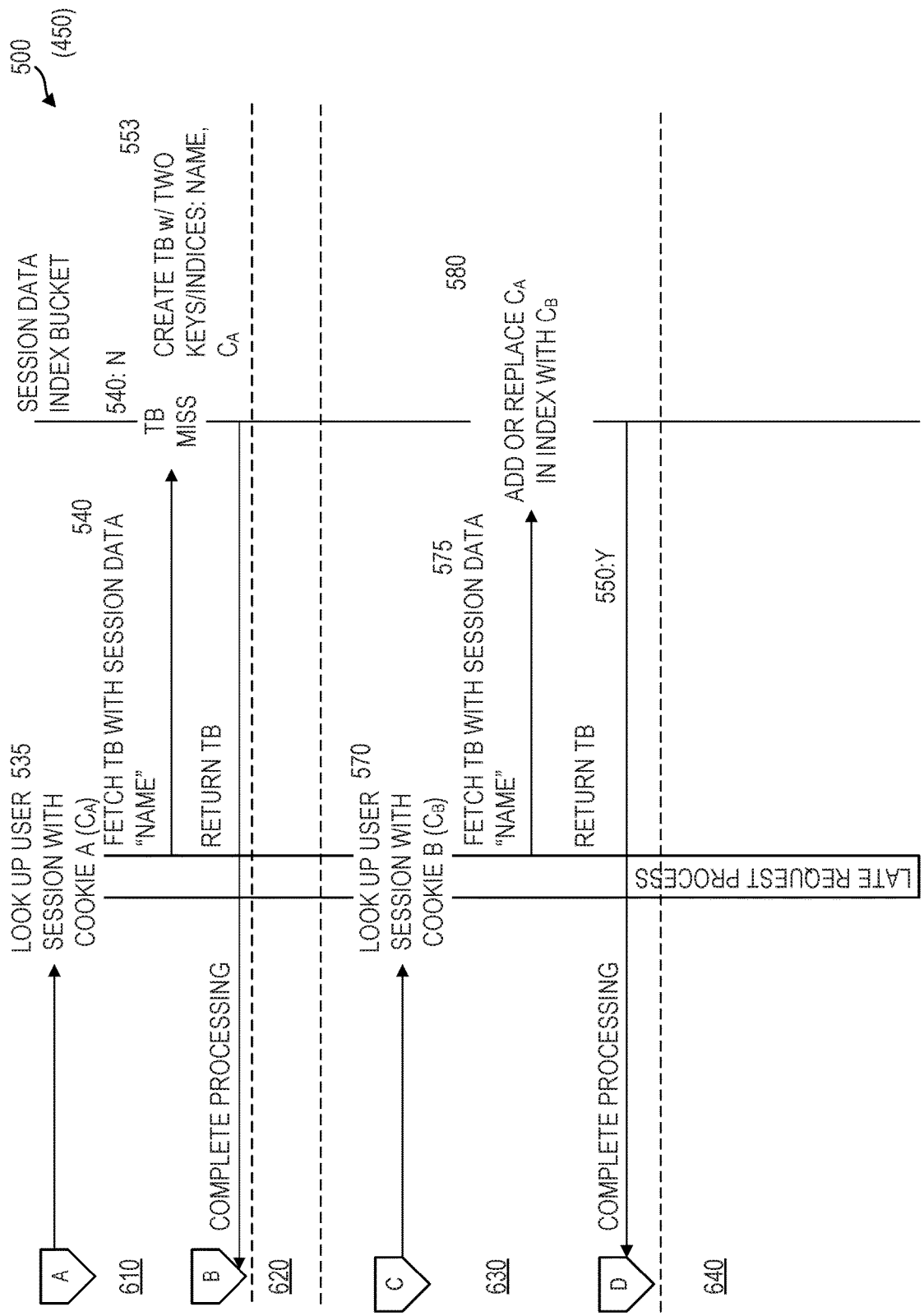

FIGS. 6A and 6B are parts of a combined timing/flow diagram illustrating the process 500 described above from a different perspective. The timing/flow diagram segregates out four web client 410 requests 412 (separated by horizontal dotted lines) being made to the web server 420, but omits certain activities described above to better focus on the rate limiting aspects. FIG. 6A focuses on the less expensive early stage process 430, whereas FIG. 6B focuses on the more expensive late stage process 450.

As shown in FIG. 6A, and as described above, the process 500 begins at operation 505 with the web server 420 receiving a request 412 from the web client 410 with CA for the first time (i.e., no TB 440 exists) in operation 610. The web server 420 looks for the TB 440 using the CA index in operation 510. As shown, it does not find the TB using the CA index (miss, 510: N). The process then continues on to the late stage process 450 of FIG. 6B involving the session data described below. With a new TB 440 created, a normal response 525 is returned (in most implementations, a rate limiting response 530 would not be present the first time around).

When the TB 440 already exists upon receipt of the request 412 with the CA in operation 505 (operation 620), the TB 440 is located using the CA index 510: Y and the TB 440 count 448 is incremented 515. When the bucket is full 520: Y, the rate-limiting response 414*b*, 530 is returned as the response 414 to the request 412. When the bucket is not full 520: N, the normal response 414*a*, 525 is returned as the response 414.

At this stage, the CA may be discarded, via, e.g., the user logging out, and a new CB may be received by the web client 410 in response to, e.g., the user logging in. As shown at operation 630, when the web client 410 sends a request 410 to the web server 420 that includes CB 555, the web server 420 then looks for the TB 440 using the CB index in operation 560, and as shown, it does not find the CB token (miss, 560: N). The process then continues on to the late stage process 450 of FIG. 6B involving use of the session data described below. With the CB index added to the TB 440, either a normal response 525 or a rate-limiting response 530 is returned, depending on whether the TB 440 is full or not.

Operation 640 is similar to operation 620 but receiving the request 412 with the CB 555 and incrementing the TB count 448, when CB is utilized. When the TB 440 is full, a rate limiting response 530 is returned, otherwise, a normal response 525 is returned.

FIG. 6B focuses on the late stage process 450. As can be seen from this figure, operations 620 and 640 have no activity within the late stage process 450, which reflects the benefits of the processing disclosed herein. Only operations 610 and 630 have activities in the late stage process 450. In operation 610, when a TB 440 cannot be found using the cookie index CA 442, the TB 440 is searched for using the username in operation 540, and, when not found (540: N), the TB is created in operation 553, as described above. The count 448 of the TB 440 may be incremented in operation 515.

Operation 630 is similar to operation 610—however, since the TB 440 already exists with the same username, albeit a different cookie identifier—now CB instead of CA currently associated with the TB 440, instead of creating a new TB 440, as was done previously, here the existing TB 440 is associated with the new cookie index CB (which retained the session data index of the username), and the TB 440 data is updated 580 with the CB information. The incrementing of the count 448 and the testing for a full TB 440 may continue as described above.

By applying the process described herein, in this example, two of the four requests were able to avoid the expensive session lookup while still achieving rate limiting on user session data using the system. Each relevant TB 440 may be associated with a username (or other session data) and a cookie (or other request metadata), allowing the bucket to be acquired using either of these items as keys and therefore provides the ability to rate limit across user sessions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising, using a processor of a server:
   receiving a request from a client via a network interface of the server;
   utilizing an early stage process to search for a rate-limiting token bucket (TB) using first metadata associated with the request;
   responsive to finding the TB using the first metadata, performing a response operation;
   responsive to not finding the TB using the first metadata, utilizing a late stage process to search for the rate-limiting TB using server-side session data associated with the request;
   responsive to not finding the TB using the session data:
   creating the TB and associating with it at least two search indexes comprising the first metadata associated with the request and the session data; and
   performing the response operation;

wherein the response operation comprises transmitting, via the network interface, a determined response to the client.

2. The method of claim 1, wherein the response operation further comprises:
 modifying a count of the TB;
 determining whether a token count criteria has been met;
 responsive to the token count criteria being met, setting the determined response to be a rate-limiting response; and
 responsive to the token count criteria not being met, setting the determined response to be a normal response.

3. The method of claim 2, wherein the client is a web client, the server is a web server, the request is a hypertext transfer protocol (HTTP) request, and the response is an HTTP response; the method further comprising:
 receiving a second request from the web client via the network interface;
 utilizing the early stage process to search for the TB using second metadata associated with the request that differs from the first metadata;
 responsive to finding the TB using the second metadata, performing the response operation;
 responsive to not finding the TB using the second metadata, utilizing the late stage process to search for the rate-limiting TB using the web server-side session data associated with the second request;
 responsive to finding the TB using the session data:
  updating a search index of the TB to include the second metadata associated with the second request; and
  performing the response operation.

4. The method of claim 3, wherein the first metadata and the second metadata are selected from the group consisting of a URL of the request, an HTTP method of the request, a header value of the request, a cookie, and over a wire information selected from the group consisting of an IP address and a MAC address.

5. The method of claim 3, wherein at least one of the first metadata and the second metadata is a cookie.

6. The method of claim 3, wherein the session data is selected from the group consisting of a username and contact information.

7. The method of claim 6, wherein the session data is a username.

8. The method of claim 3, wherein the second metadata replaces the first metadata in the TB.

9. The method of claim 2, wherein:
 the modifying of the count is incrementing the count; and
 the token count criteria is that the TB is full.

10. The method of claim 2, wherein:
 the modifying of the count is decrementing the count; and
 the token count criteria is that the TB is empty.

11. The method of claim 1, wherein the session data is available only to the server.

12. The method of claim 1, wherein the first metadata is obtainable solely from the contents of the request or a communication channel associated with the request.

13. A server computer system providing rate limiting, the system comprising:
 a processor configured to:
  receive a request from a client via a network interface of the server;
  utilize an early stage process to search for a rate-limiting token bucket (TB) using first metadata associated with the request;
  responsive to finding the TB using the first metadata, perform a response operation;
  responsive to not finding the TB using the first metadata, utilize a late stage process to search for the rate-limiting TB using server-side session data associated with the request;
  responsive to not finding the TB using the session data:
   create the TB and associate with it at least two search indexes comprising the first metadata associated with the request and the session data; and
   perform the response operation;
  wherein the response operation comprises the processor being configured to transmit, via the network interface, a determined response to the client.

14. The system of claim 13, wherein the processor is further configured to:
 modify a count of the TB;
 determine whether a token count criteria has been met;
 responsive to the token count criteria being met, set the determined response to be a rate-limiting response; and
 responsive to the token count criteria not being met, set the determined response to be a normal response.

15. The system of claim 14, wherein the client is a web client, the server is a web server, the request is a hypertext transfer protocol (HTTP) request, and the response is an HTTP response, and the processor is further configured to:
 receive a second request from the web client via the network interface;
 utilize the early stage process to search for the TB using second metadata associated with the request that differs from the first metadata;
 responsive to finding the TB using the second metadata, perform the response operation;
 responsive to not finding the TB using the second metadata, utilize the late stage process to search for the rate-limiting TB using the web server-side session data associated with the second request;
 responsive to finding the TB using the session data:
  update a search index of the TB to include the second metadata associated with the second request; and
  perform the response operation.

16. The system of claim 15, wherein the first metadata and the second metadata are cookies and the session data is a username.

17. The system of claim 13, wherein the second metadata replaces the first metadata in the TB.

18. The system of claim 13, wherein the session data is available only to the server.

19. The system of claim 13, wherein the metadata is obtainable solely from the contents of the request or a communication channel associated with the request.

20. A computer program product comprising a computer readable storage medium having computer-readable program code embodied therewith to, when executed on a processor:
 receive a request from a client via a network interface of the server;
 utilize an early stage process to search for a rate-limiting token bucket (TB) using first metadata associated with the request;
 responsive to finding the TB using the first metadata, perform a response operation;
 responsive to not finding the TB using the first metadata, utilize a late stage process to search for the rate-limiting TB using server-side session data associated with the request;

responsive to not finding the TB using the session data:
create the TB and associating with it at least two search indexes comprising the first metadata associated with the request and the session data; and
perform the response operation;
wherein the response operation comprises the processor being configured to transmit, via the network interface, a determined response to the client.

* * * * *